US011928560B2

(12) United States Patent
Funane

(10) Patent No.: US 11,928,560 B2
(45) Date of Patent: Mar. 12, 2024

(54) SYSTEM, METHOD, AND STORAGE MEDIUM

(71) Applicant: CANON KABUSHIKI KAISHA, Tokyo (JP)

(72) Inventor: Nao Funane, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 869 days.

(21) Appl. No.: 16/918,856

(22) Filed: Jul. 1, 2020

(65) Prior Publication Data

US 2021/0012241 A1 Jan. 14, 2021

(30) Foreign Application Priority Data

Jul. 8, 2019 (JP) ................................. 2019-127057

(51) Int. Cl.
*G06N 20/00* (2019.01)
*G06F 11/30* (2006.01)
*G06F 18/214* (2023.01)
*G06N 5/04* (2023.01)

(52) U.S. Cl.
CPC ........... *G06N 20/00* (2019.01); *G06F 11/302* (2013.01); *G06F 18/214* (2023.01); *G06N 5/04* (2013.01)

(58) Field of Classification Search
CPC .......... G06N 20/00; G06N 5/04; G06F 18/24; G06F 18/214; G06F 11/302; G06F 11/3006; G06F 11/3055; G06F 11/3452
See application file for complete search history.

(56) References Cited

U.S. PATENT DOCUMENTS

2019/0102700 A1* 4/2019 Babu ...................... G06N 5/025
2019/0188605 A1* 6/2019 Zavesky ................ G06N 20/00
2020/0082299 A1* 3/2020 Vasconcelos .......... G06N 20/00
(Continued)

FOREIGN PATENT DOCUMENTS

JP 2019016279 A 1/2019

OTHER PUBLICATIONS

Veale, "Fairer machine learning in the real world: Mitigating discrimination without collecting sensitive data", Big Data & Society Jul.-Dec. 2017: 1-17. (Year: 2017).*
(Continued)

*Primary Examiner* — Dave Misir
(74) *Attorney, Agent, or Firm* — ROSSI, KIMMS & McDOWELL LLP

(57) ABSTRACT

A system monitoring a plurality of models generated through machine learning includes a monitoring unit that perform warning of a specific item of an input corresponding to a predetermined condition if a prediction result by a first model using the input including a plurality of values satisfies the predetermined condition, and a provision unit that provides a message prompting setting of a condition which is a monitoring target by the monitoring unit in the specific item with regard to a second model different from the first model. The provision unit provides the message in at least one of a case in which the predetermined condition is set for the first model, a case in which the prediction result by the first model is determined to satisfy the predetermined condition, and a case in which the second model is registered in the system.

8 Claims, 9 Drawing Sheets

(56) References Cited

U.S. PATENT DOCUMENTS

2020/0372435 A1* 11/2020 Kenthapadi ....... G06F 16/90335

OTHER PUBLICATIONS

Bellamy, "AI Fairness 360: An Extensible Toolkit for Detecting, Understanding, and Mitigating Unwanted Algorithmic Bias", 2018. (Year: 2018).*

Tsuchiya et al. "Building Transparency and Trust in AI Systems,"IBM Watson OpenScale" ensures the "transperency" and "fairness" required by enterprises", Provision 2019 No. 95, Professional Vision for Information Technology, IBM Japan, Ltd., p. 40-45. English abstract provided.

* cited by examiner

Fairness management system

Monitoring item setting: Car insurance prediction model

☑ Age
  Target designation method  ○ Value  ● Range
    Monitoring target  [18]  ~  [25]
    Comparison target  [26]  ~  [60]
    Threshold  [0.9]

☑ sex
  Target designation method  ● Value  ○ Range
    Monitoring target  [Female ▾]
    Comparison target  [Male ▾]
    Threshold  [0.9]

☐ Number of license years

☐ Driving frequency

[Confirm]  [Cancel]

Business system — 500-2

Car insurance examination — 501

- Name:
- Address:
- Age: 35
- Sex: Male
- Number of license years: 10
- Driving frequency: Daily Examination prediction — 502
Approval — 503
Confirm — 504
Cancel — 505

SYSTEM, METHOD, AND STORAGE MEDIUM

BACKGROUND OF THE INVENTION

Field of the Invention

The present invention relates to a system, a method, and a storage medium monitoring a learned model of machine learning.

Description of the Related Art

In machine learning, a learning model is adjusted using learning data and the learning model of which the adjustment is completed practically runs as a learned model. In the related art, prediction systems that predict given matters using such learned models are known. For example, Japanese Patent Laid-Open No. 2019-16279 discloses that a learned model is corrected, for example, by allowing a user to change weighting of determination elements when the user feels discomfort with a determination result of the learned model.

Incidentally, when a user runs a learned model, a different learned model is operated for each of a plurality of businesses in some cases. When the plurality of learned models run in this way, the technology of the related art such as Japanese Patent Laid-Open No. 2019-16279 is not considered.

In the learned model, an unintentional bias may occur and fairness is not guaranteed in some cases. For example, in a system that predicts whether to approve of a loan for a subject, whether to approve of the loan is determined by a learned model based on input data such as an age, a sex, an income, and a length of service of the subject. In such a learned model, a bias such as prediction that it is easier to approve a male than a female or prediction that it is easier to approve older people than younger people occurs unintentionally in some cases. When there is such a bias in a learned model which is running, it is desirable to correct the bias and guarantee fairness.

In the related art, when a plurality of learned models run, it is necessary to verify the bias of each of the plurality of learned models, items and standards having an influence on fairness have to be examined and set, and thus there is the problem that it is time-consuming. Of the plurality of learned models, some of the learned models are appropriately set, but setting of the other learned models in which the same setting has to be performed is missed, and thus there is a possibility of a setting error occurring.

SUMMARY OF THE INVENTION

An embodiment of the present invention provides a system capable of reducing labor of maintaining fairness when a plurality of learned models run.

According to an embodiment of the present invention, a system monitors a plurality of models generated through machine learning. The system includes: a memory storing instructions; and a processor executing the instructions causing the system: to perform monitoring to warn of a specific item of an input corresponding to a predetermined condition if a prediction result by a first model using the input including a plurality of values satisfies the predetermined condition, and to provide a message prompting setting of a condition which is a target of the monitoring in the specific item with regard to a second model different from the first model. The message is provided in at least one of a case in which the predetermined condition is set for the first model, a case in which the prediction result by the first model is determined to satisfy the predetermined condition, and a case in which the second model is registered in the system.

Further features of the present invention will become apparent from the following description of exemplary embodiments with reference to the attached drawings.

DESCRIPTION OF THE EMBODIMENTS

Hereinafter, modes for carrying out the present invention will be described in detail with reference to the drawings.

<System Configuration>

Figure 1:
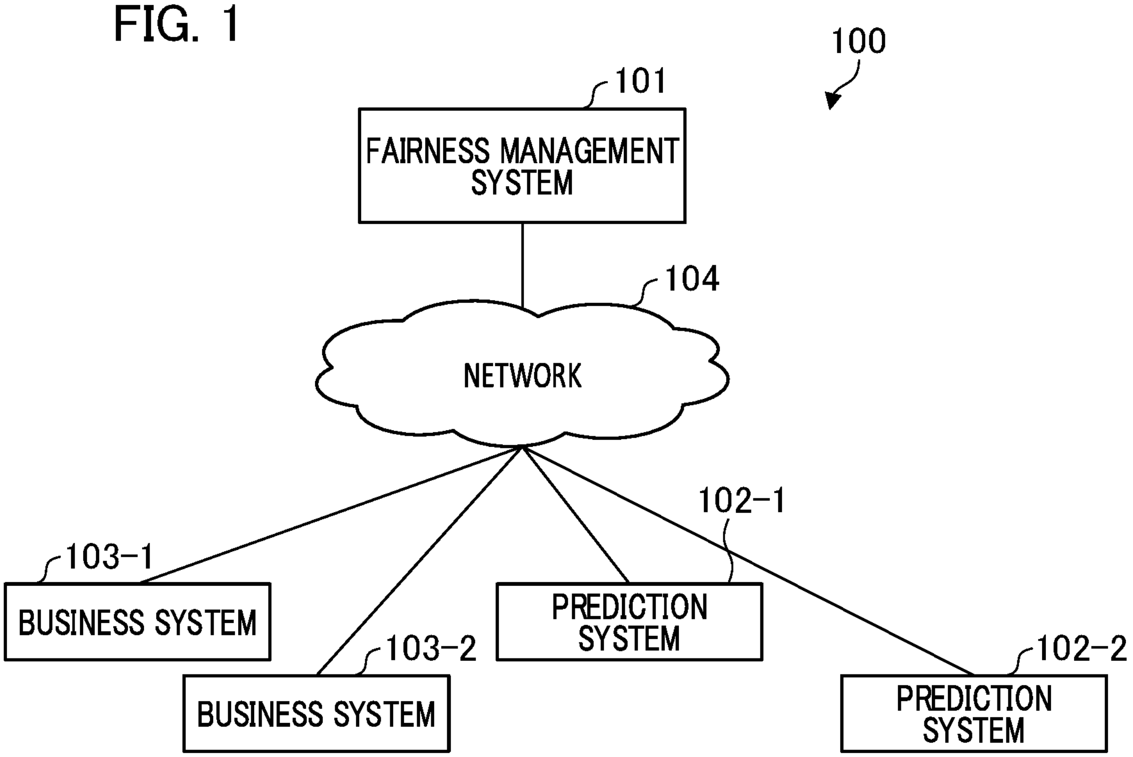
FIG. 1 is a schematic diagram illustrating an entire configuration of a system according to an embodiment of the present invention.

FIG. 1 is a schematic diagram illustrating an entire configuration of a system according to a first embodiment of the present invention.

A system 100 according to the first embodiment of the present invention includes a fairness management system 101, a prediction system 102-1, a prediction system 102-2, a business system 103-1, and a business system 103-2. The fairness management system 101, the prediction system 102-1, the prediction system 102-2, the business system 103-1, and the business system 103-2 are each configured by one or more information processing devices. The plurality of systems may be configured by one information processing device. Here, the information processing device is any of various computers such as a personal computer, a virtual machine, or the like. The virtual machine is, for example, a virtual computer that emulates an operation in accordance with a software program. An information processing device 200 which is an example of the information processing device will be described below with reference to FIG. 2. The fairness management system 101 is a system that monitors whether fairness is guaranteed for a learned model operating in each of the prediction systems 102-1 and 102-2. The learned model is generated by learning a learning model using learning data. The learned model is a model generated through machine learning.

Here, the fairness is, for example, a viewpoint on whether it is fair for a user receiving a prediction result obtained using a learned model and a user provided with a service based on an actual prediction result. Further, the fairness is, for example, a viewpoint on whether standards based on institutions, customs, and culture in a country and an environment in which a learned model actually runs are fair. That is, the standards used to determine fairness are likely to vary depending on users and use environments.

In the embodiment, guarantee of the fairness to outputs obtained using prediction results of learned models can be said to be a state in which the fairness to the standards is satisfied. Further, the standards for determining the fairness can be set by, for example, users or the like who run the learned models.

The prediction system 102-1 is a system that is requested from the business system 103-1 and performs prediction using a learned model. The business system 103-1 is a system that performs an insurance application examination of application content of a person who wants to apply for life insurance. The learned model of the prediction system 102-1 is an example of a second model.

The prediction system 102-2 is a system that is requested from the business system 103-2 and performs prediction using a learned model. The business system 103-2 is a system that performs an insurance application examination of application content of a person who wants to apply for car insurance. The learned model of the prediction system 102-2 is an example of a first model.

A network 104 may be a network such as the Internet and the type is not particularly significant. The fairness management system 101, the prediction system 102-1, the prediction system 102-2, the business system 103-1, and the business system 103-2 can perform communication with each other via the network 104.

<Internal Configuration of Information Processing Device>

Figure 2:
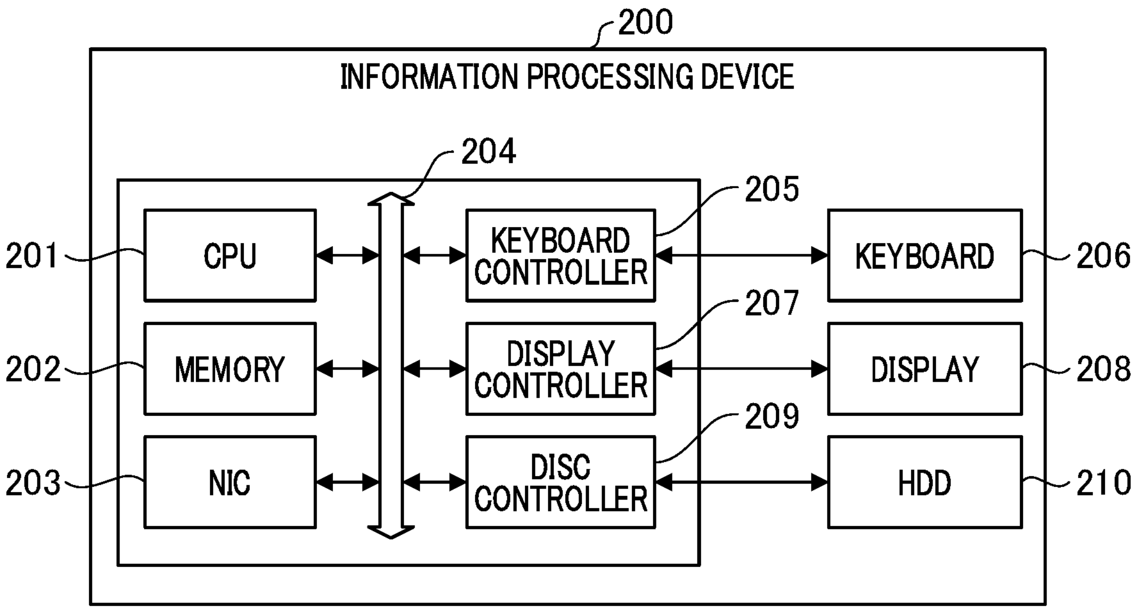
FIG. 2 is a block diagram illustrating an internal configuration of an information processing device included in the system according to the embodiment of the present invention.

FIG. 2 is a block diagram illustrating an example of an internal configuration of an information processing device included in the system 100 illustrated in FIG. 1.

Each of the fairness management system 101, the prediction system 102-1, the prediction system 102-2, the business system 103-1, and the business system 103-2 illustrated in FIG. 1 is configured by the information processing device 200 in FIG. 2.

The information processing device 200 includes a CPU 201 that executes a program controlling an operation of the system 100 according to the embodiment. "CPU" is an abbreviation for "central processing unit." The information processing device 200 includes a system bus 204. The CPU 201 generally controls hardware connected to the system bus 204. The information processing device 200 includes an HDD 210 and a disc controller 209. "HDD" is an abbreviation for "hard disk drive." The HDD 210 is an example of a storage device and is a large-capacity storage device herein. The HDD 210 stores a program executed by the CPU 201. The disc controller 209 controls the HDD 210.

The information processing device 200 includes a memory 202. The memory 202 functions as a main memory, a work area, or the like of the CPU 201. The information processing device 200 includes an NIC 203. "NIC" is an abbreviation for "network interface card." The NIC 203 transmits and receives data to and from another node connected to the network 104 in two directions via the network 104. The information processing device 200 includes a keyboard 206 and a keyboard controller 205. A user operates the keyboard 206 to perform an instruction input to the information processing device 200. The keyboard controller 205 performs control such that the instruction input performed using the keyboard 206 is received. The information processing device 200 may not include the keyboard controller 205 and the keyboard 206 depending on its role. The information processing device 200 includes a display 208 and a display controller 207. The display 208 is a display module configured by a liquid crystal display or the like. The display controller 207 performs control of display on the display 208. The information processing device 200 may not include the display 208 and the display controller 207 depending on its role.

Hereinafter, a configuration of each of the fairness management system 101, the prediction system 102-1, the prediction system 102-2, the business system 103-1, and the business system 103-2 will be further described. The configurations of the prediction systems 102-1 and 102-2 will be described when the prediction system 102 illustrated in FIG. 3B is described. The configurations of the business systems 103-1 and 103-2 will be described when the business system 103 illustrated in FIG. 3C is described.

<Functional Configuration of Fairness Management System>

Figure 3A:
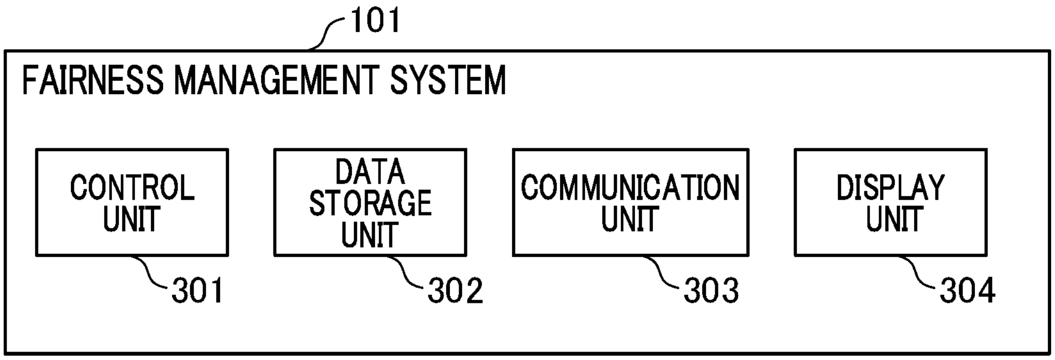
FIG. 3A is a block diagram illustrating an example of a functional configuration of a fairness management system 101.
Figure 3B:
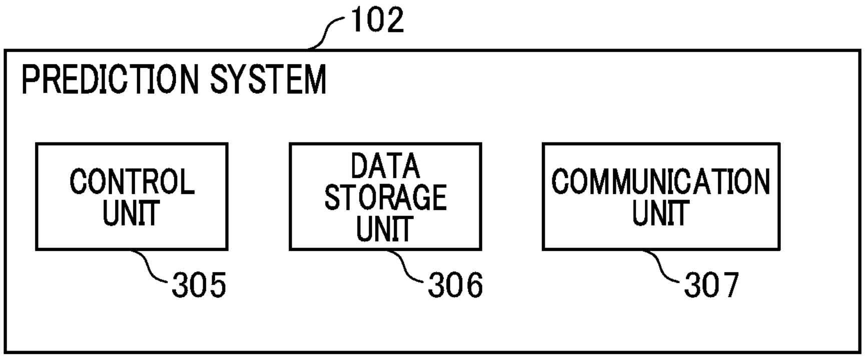
FIG. 3B is a block diagram illustrating an example of a functional configuration of a prediction system 102.
Figure 3C:
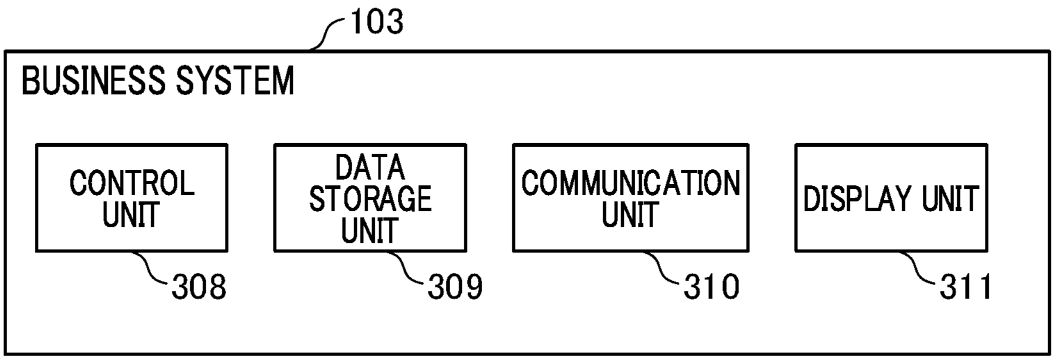
FIG. 3C is a block diagram illustrating an example of a functional configuration of a business system 103.

FIG. 3A is a block diagram illustrating an example of a functional configuration of the fairness management system 101.

The fairness management system 101 includes a control unit 301, a data storage unit 302, a communication unit 303, and a display unit 304. Each configuration of the fairness management system 101 illustrated in FIG. 3A is realized by causing the CPU 201 to read a program stored in the HDD 210 of the fairness management system 101 to the memory 202 and execute the program.

The control unit 301 is a software module that receives an instruction to perform various processes in the display unit 304 or the like and performs the various processes.

The data storage unit 302 is a database included in the HDD 210.

The communication unit 303 is a software module that communicates with the prediction system 102 in FIG. 3B and the business system 103 in FIG. 3C via the network 104.

The display unit 304 is a software module that displays a UI of the fairness management system 101 or receives an operation from a user. "UI" is an abbreviation for "user interface."

<Functional Configuration of Prediction System>

FIG. 3B is a block diagram illustrating an example of a functional configuration of the prediction system 102.

The prediction system 102 includes a control unit 305, a data storage unit 306, and a communication unit 307. Each configuration of the prediction system 102 illustrated in FIG. 3B is realized by causing the CPU 201 to read a program stored in the HDD 210 of the prediction system 102 to the memory 202 and execute the program.

The control unit 305 is a software module that performs various processes such as a prediction process.

The data storage unit 306 is a database included in the HDD 210.

The communication unit 307 is a software module that communicates with the fairness management system 101 and the business system 103 via the network 104.

<Functional Configuration of Business System>

FIG. 3C is a block diagram illustrating an example of a functional configuration of a business system 103.

The business system 103 includes a control unit 308, a data storage unit 309, a communication unit 310, and a display unit 311. Each configuration of the business system 103 illustrated in FIG. 3C is realized by causing the CPU 201 to read a program stored in the HDD 210 of the business system 103 to the memory 202 and execute the program.

The control unit 308 is a software module that receives an instruction to perform various processes in the display unit 311 or the like and performs the various processes.

The data storage unit 309 is a database included in the HDD 210.

The communication unit 310 is a software module that communicates with the fairness management system 101 and the prediction system 102 via the network 104.

The display unit 311 is a software module that displays a UI of the business system 103 or receives an operation from a user.

<Setting Process of Monitoring Fairness>

In the embodiment, a case in which a certain insurance company A sells life insurance and car insurance and examines an application for the insurance using each learned model will be described. The business system 103-1 in FIG. 1 is a system that performs life insurance business. The business system 103-2 in FIG. 1 is a system that performs car insurance business. The prediction system 102-1 in FIG. 1 is a life insurance prediction system that examines an application using the learned model for the life insurance business. The prediction system 102-2 in FIG. 1 is a car insurance prediction system that examines an application using the learned model for the car insurance business. The insurance company A runs the business system 103-1 and the prediction system 102-1, and the business system 103-2 and the prediction system 102-2.

The prediction system 102-1 which is a life insurance prediction system uses a learned model learned to determine whether application for life insurance is possible, for example, when an "age" and a "clinical record" are input. The learned model used in the prediction system 102-1 is stored in the data storage unit 306 of the prediction system 102-1. The learned model used in the prediction system 102-1 is referred to as a life insurance model.

The prediction system 102-2 which is a car insurance prediction system uses a learned model learned to determine whether application for car insurance is possible, for example, when an "age," a "sex," a "number of license years," and a "driving frequency" are input. The learned model used in the prediction system 102-2 is stored in the data storage unit 306 of the prediction system 102-2. The learned model used in the prediction system 102-2 is referred to as a car insurance model.

The fairness management system 101 monitors fairness between the prediction systems 102-1 and 102-2. The fairness management system 101 manages input items of the learned models of the prediction systems 102-1 and 102-2 which are monitoring targets.

Table 1 is a table that shows an example of a learned model management table. The learned model management table is stored in the data storage unit 302 of the fairness management system 101. In the learned model management table, one record indicates one learned model. The learned model management table has columns for users, models, and items. In the learned model management table, input items learned with a life insurance model and a car insurance model run by a user of the fairness management system 101, that is, the insurance company A that is a user of the system 100, are stored.

TABLE 1

| Users | Models | Items |
|---|---|---|
| Insurance company A | Life insurance | Age, Clinical record |
| Insurance company A | Car insurance | Age, Sex, Number of license years, Driving frequency |

Figure 4A:
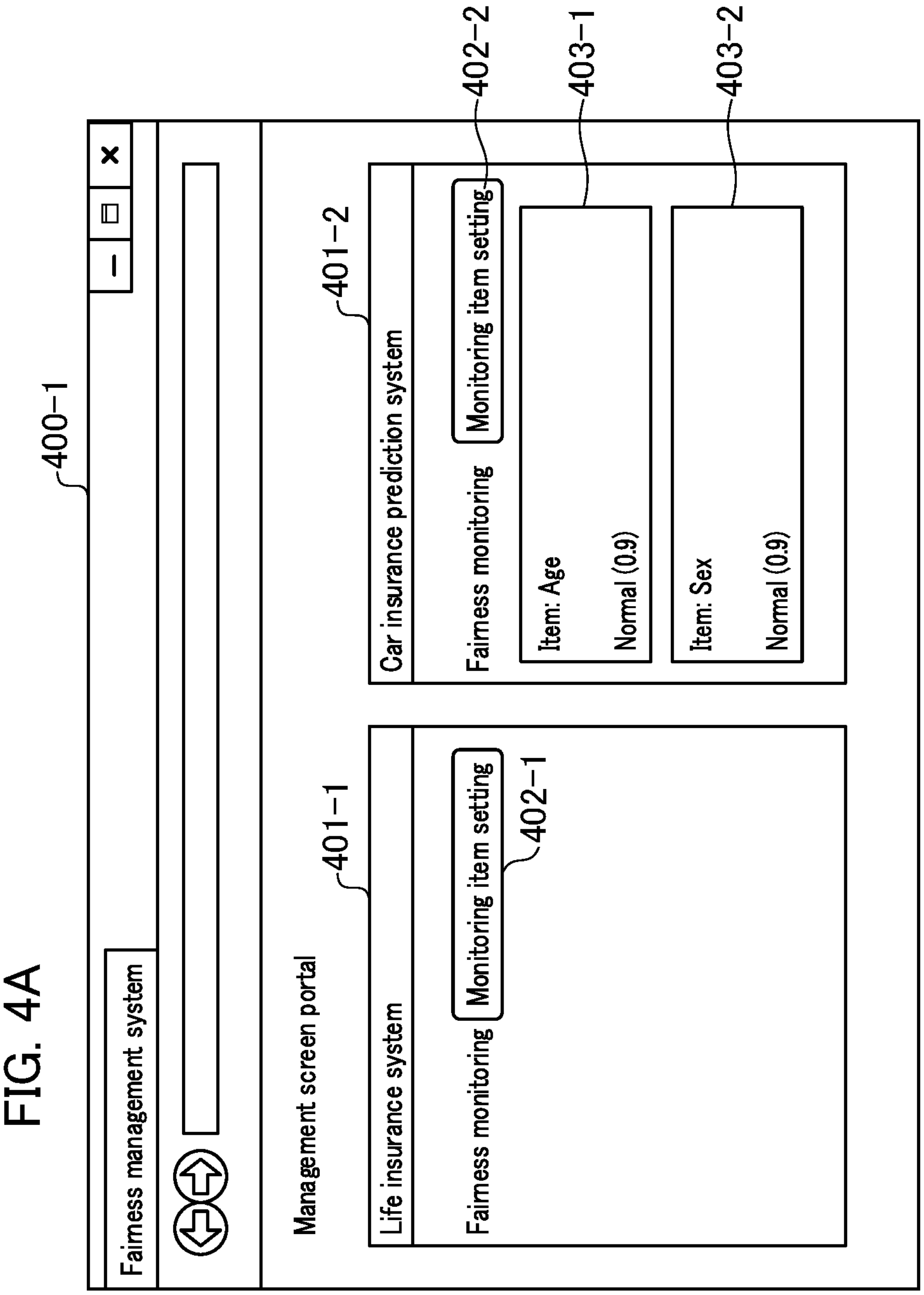
FIGS. 4A and 4B are diagrams illustrating examples of screens displayed by a display unit 304 of the fairness management system 101.
Figure 4B:
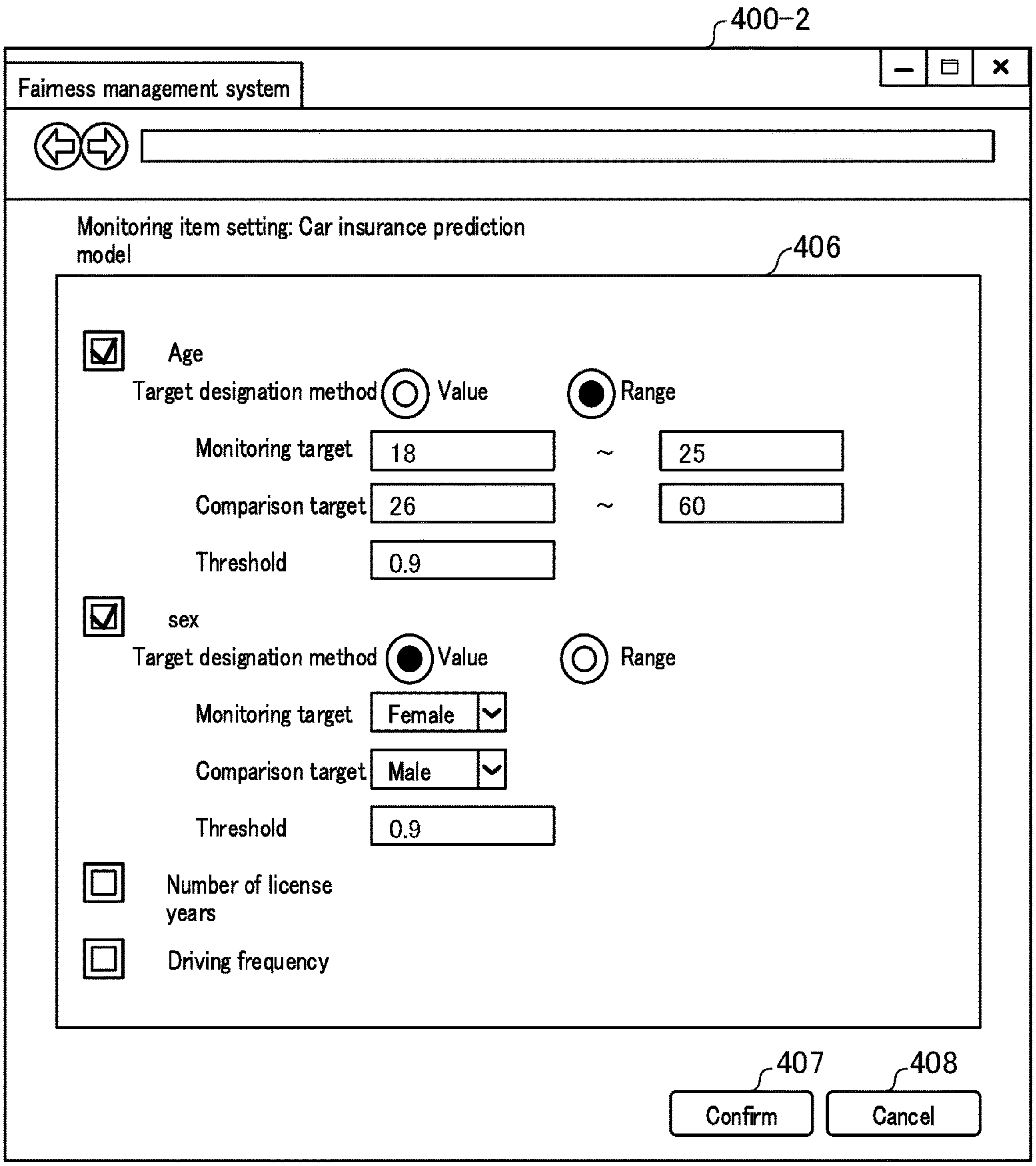

FIGS. 4A and 4B are diagrams illustrating screens displayed by a display unit 304 of the fairness management system 101. The screens are generated by the display unit 304 of the fairness management system 101 and are displayed on a browser of a PC used by a prediction system manager of the insurance company A in response to a request from the browser of the PC. "PC" is an abbreviation for "personal computer." The PC is connected to the network 104 and can communicate with the fairness management system 101. The PC may have a different configuration from the fairness management system 101 or may be configured by the fairness management system 101.

FIG. 4A illustrates an example of a prediction system monitoring screen when the fairness management system 101 monitors two prediction systems, the prediction systems 102-1 and 102-2. The prediction system 102-1 is a life insurance prediction system that predicts an application examination result of the life insurance and the prediction system 102-2 is a car insurance prediction system that predicts an application examination of the car insurance.

A prediction system monitoring screen 400-1 in FIG. 4A has areas 401-1 and 401-2 which are areas for prediction systems of monitoring targets. The area 401-1 is an area in which display of a monitoring state and monitoring setting for the prediction system 102-1 are performed. The area 401-2 is an area in which display of a monitoring state and monitoring setting for the prediction system 102-2 are performed. When the number of prediction systems of monitoring targets is 3 or more, an area for each prediction system is displayed.

Each of the areas 401-1 and 401-2 has a button for setting a monitoring item and an area in which a monitoring state is displayed. The area 401-1 has a button 402-1 for setting the monitoring item. In FIG. 4A, since a monitoring item for the prediction system 102-1 is not set, an area in which a monitoring state is displayed is not displayed in the area 401-1 for the prediction system 102-1. The area 401-2 has a button 402-2 for setting a monitoring item and areas 403-1 and 403-2 in which monitoring states are displayed. A method of generating areas in which a monitoring state is displayed as in the areas 403-1 and 403-2 will be described later.

The prediction system manager performs monitoring setting for each prediction system from the prediction system monitoring screen 400-1. Hereinafter, an example of a procedure when the monitoring setting is performed will be described.

It is assumed that the prediction system manager does not feel that there should be sex and age discrimination with regard to car insurance and determines the sex and age in the input to the prediction system 102-2 as fairness monitoring targets. It is assumed that the prediction system manager does not feel that there is any particular item for which fairness is a concern with regard to life insurance and determines that there is no monitoring target. In this case, the prediction system manager presses the button 402-2 of the prediction system monitoring screen 400-1 and performs monitoring setting for the car insurance prediction system.

When a press of the button 402-2 of the prediction system monitoring screen 400-1 is received, the display unit 304 of the fairness management system 101 displays the screen of FIG. 4B. FIG. 4B illustrates an example of the monitoring item setting screen displayed in the fairness management system 101 when a press of the buttons for setting the monitoring item is received.

When a press of a button for setting a monitoring item is received, the control unit 301 of the fairness management system 101 acquires a record for the model of the prediction system associated with the button from the learned model management table (Table 1). When a press of the button 402-2 is received, the control unit 301 acquires a record in which a column of "model" in the learned model management table is car insurance. Subsequently, the control unit 301 acquires values of "item" of the acquired record and the display unit 304 of the fairness management system 101 displays the acquired value of "item" on the monitoring item setting screen 400-2 in FIG. 4B. For example, a press of the button 402-2 is received, the values of "item" of the record acquired by the control unit 301 are an age, a sex, a number of license years, and a driving frequency. The display unit 304 displays the values of "item" as monitoring item candidates on the monitoring item setting screen 400-2 and receives an input of whether each item is set as a monitoring item and relevant information by the prediction system manager.

As illustrated in FIG. 4B, the monitoring item setting screen 400-2 has a monitoring item setting area 406, a button 407 for confirming setting of a monitoring item, and a button 408 for canceling the setting of the monitoring item. The monitoring item candidates are displayed and whether to set the monitoring item candidates as monitoring items and relevant information of the monitoring items are input in the monitoring item setting area 406. The relevant information of the monitoring items includes, for example, information regarding a monitoring target, information regarding a comparison target, and a threshold. For example, a method of setting the monitoring item is checked in a check box of an item which is desired to be monitored and the relevant information of the monitoring item is input as a "value" or a "range." Whether the "value" is input or the "range" is input in this input is a target designation method. When the "value" is input, the input "value" may be selected in a pull-down manner.

In the example of FIG. 4B, the "age" is selected in the monitoring target item, "18 to 25" years old is set as a monitoring target, and a warning is set to be given when a prediction result of "26 to 60" years old falls below a threshold of 0.9. In the example of FIG. 4B, the "sex" is selected in the monitoring target item, "female" is set as a monitoring target, and a warning is set to be given when a comparison result with "male" falls below a threshold of 0.9. Here, in the comparison method, a ratio is calculated in accordance with an approval ratio of the monitoring target to an approval ratio of the comparison target. The "age" of the input data which is "18 to 25" years old is an example of a first input value. The "age" of the input data which is "26 to 60" years old is an example of a second input value. The "sex" of the input data which is "female" is an example of the first input value. The "sex" of the input data which is "male" is an example of the second input value. The approval ratio of the monitoring target is an example of a first ratio. The approval ratio of the comparison target is an example of a second ratio. When the ratio is less than the threshold, a bias occurs in the learned model and the monitoring target is determined to be disadvantageous. The fact that "the ratio falls below the threshold" is an example of a predetermined condition. The fact that "the ratio falls below the threshold" is an example of a case in which a prediction result satisfies a predetermined condition. The fact that "the ratio does not fall below the threshold" is an example of a case in which the prediction result does not satisfy the predetermined condition. The "approval" of the prediction result is an example of the prediction result which is a predetermined prediction result. The predetermined condition is, for example, a condition that is satisfied when there is a bias between a prediction result by the first model using an input including the first input value and a prediction result by the first model using an input including a second input value.

The display unit 304 stores monitoring content input on the monitoring item setting screen 400-2 in the fairness monitoring table when a press of the button 407 by the prediction system manager is received on the monitoring item setting screen 400-2.

Table 2 is a table that shows an example of the fairness monitoring table. The fairness monitoring table is stored in the data storage unit 302 of the fairness management system 101. In the fairness monitoring table, one record indicates one monitoring item. The fairness monitoring table has columns for users, models, items, target designation methods, monitoring targets, comparison targets, and thresholds.

TABLE 2

| Users | Models | Items | Target designation method | Monitoring targets | Comparison target | threshold |
|---|---|---|---|---|---|---|
| Insurance company A | Car insurance | Age | Range | 18 to 25 | 26 to 60 | 0.9 |
| Insurance company A | Car insurance | Sex | Value | Female | Male | 0.9 |

<Process for Insurance Application Examination>

Figure 5A:
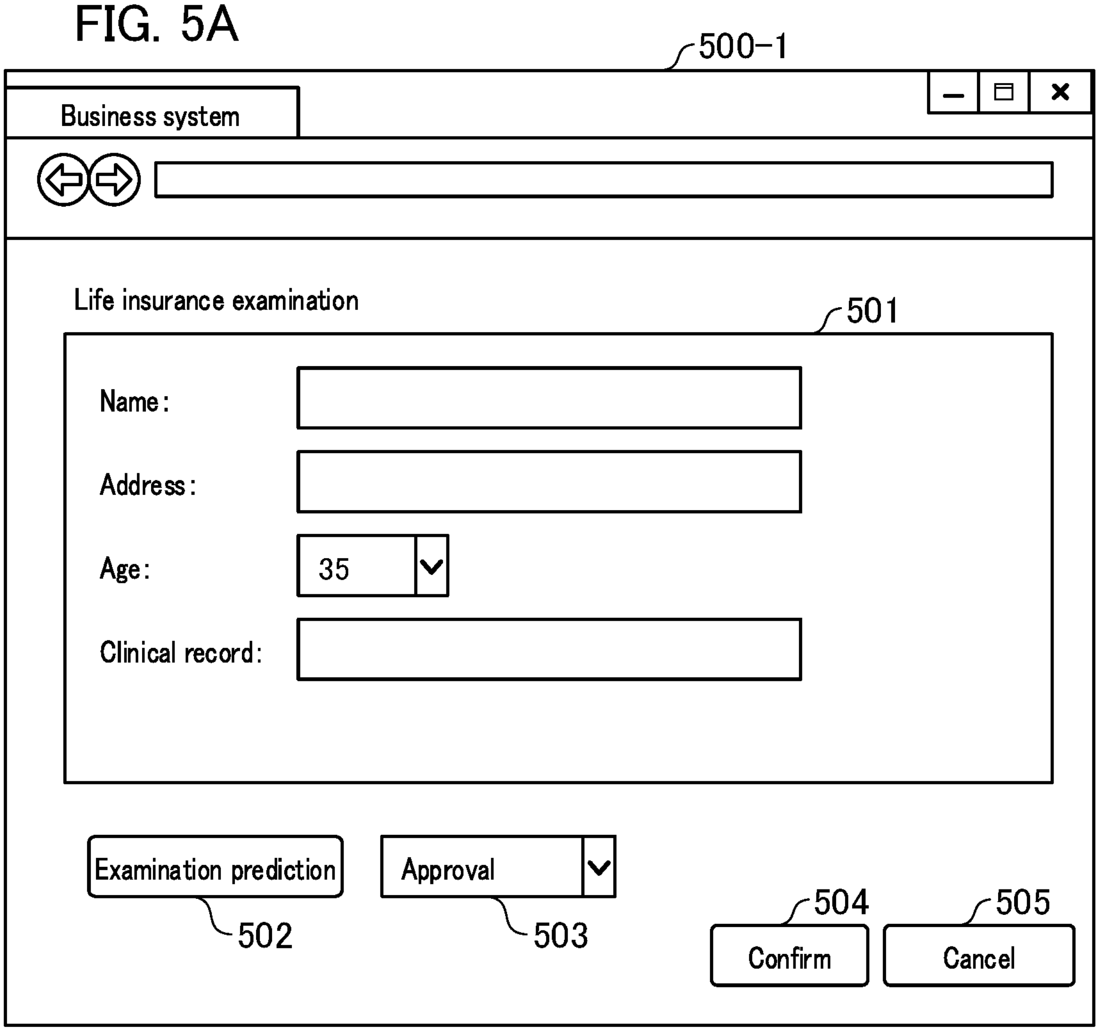
FIG. 5A is a diagram illustrating an example of a life insurance application examination screen displayed by a display unit 311 of a business system 103-1 and FIG. 5B is a diagram illustrating an example of a car insurance application examination screen displayed by a display unit 311 of a business system 103-2.

FIG. 5A is a diagram illustrating an example of a life insurance application examination screen displayed by the display unit 311 of the business system 103-1. This screen is generated by the display unit 311 of the business system 103-1 and is displayed on a browser of a PC used by a manager examining a life insurance application in response to a request from the browser of the PC. The PC is connected to the network 104 and can communicate with the business system 103-1. The PC may have a different configuration from the business system 103-1 or may be configured by the business system 103-1.

A life insurance application examination screen 500-1 has a data input section 501, a button 502, a pull-down 503, a button 504, and a button 505. The button 502 is a button used to perform examination prediction. The pull-down 503 is a pull-down used to display a prediction result and select a determination result of a manager. The button 504 is a button used to confirm an application examination result. The button 505 is a button used to cancel the examination. As the prediction result, there are a "approval" indicating acknowledgment of a life insurance application and a "rejection" indicating refusal of the life insurance application.

Figure 5B:
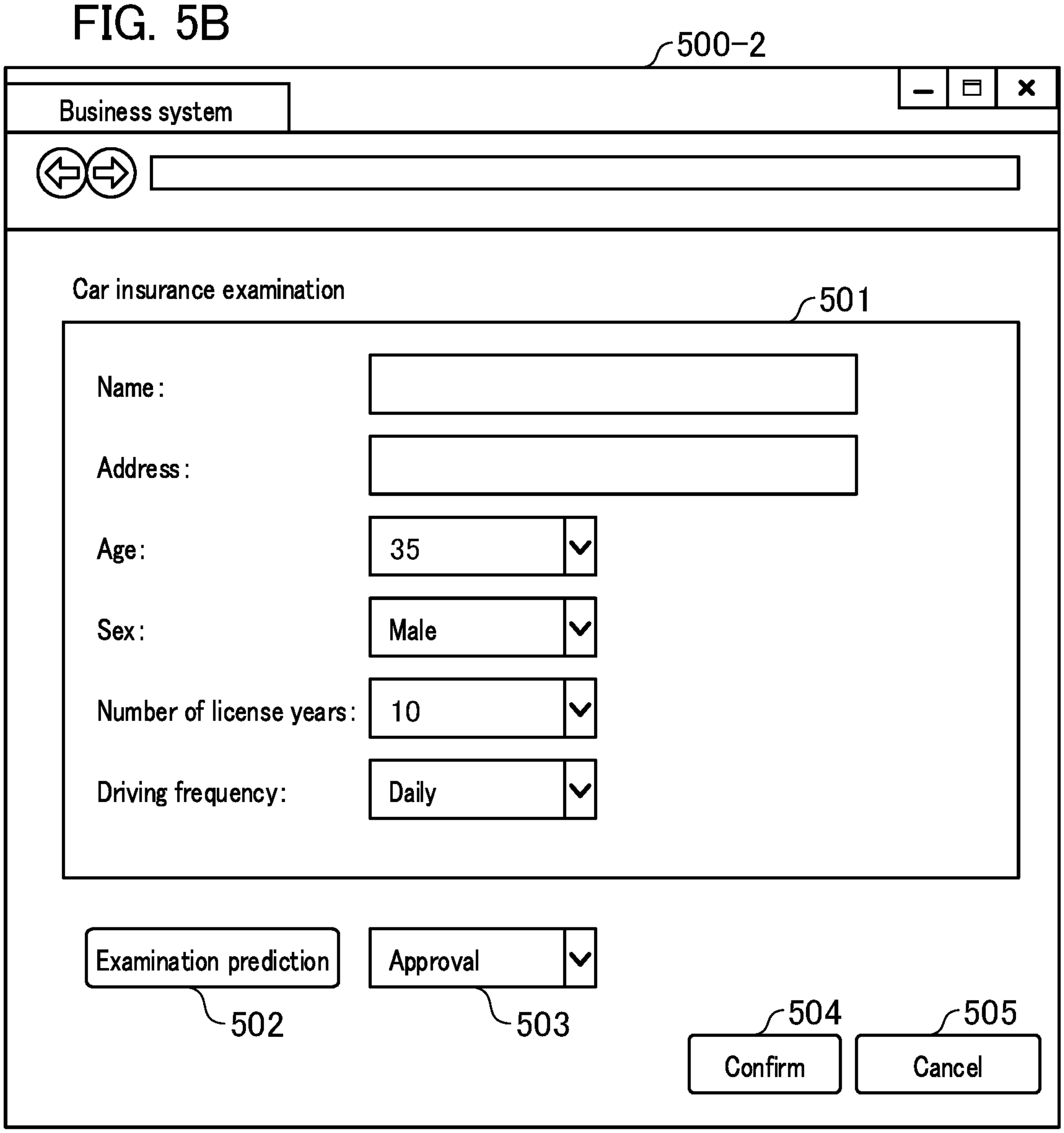

FIG. 5B is a diagram illustrating an example of a car insurance application examination screen displayed by the display unit 311 of the business system 103-2. This screen is generated by the display unit 311 of the business system 103-2 and is displayed on a browser of a PC used by a manager examining a car insurance application in response to a request from the browser of the PC. The PC is connected to the network 104 and can communicate with the business system 103-2. The PC may have a different configuration from the business system 103-2 or may be configured by the business system 103-2.

A car insurance application examination screen 500-2 has a data input section 501, a button 502, a pull-down 503, a button 504, and a button 505. The button 502 is a button used to perform examination prediction. The pull-down 503 is a pull-down used to display a prediction result and select a determination result of a manager. The button 504 is a button used to confirm an application examination result. The button 505 is a button used to cancel the examination. As the prediction result, there are a "approval" indicating acknowledgment of a car insurance application and "rejection" indicating refusal of the car insurance application.

Figure 6:
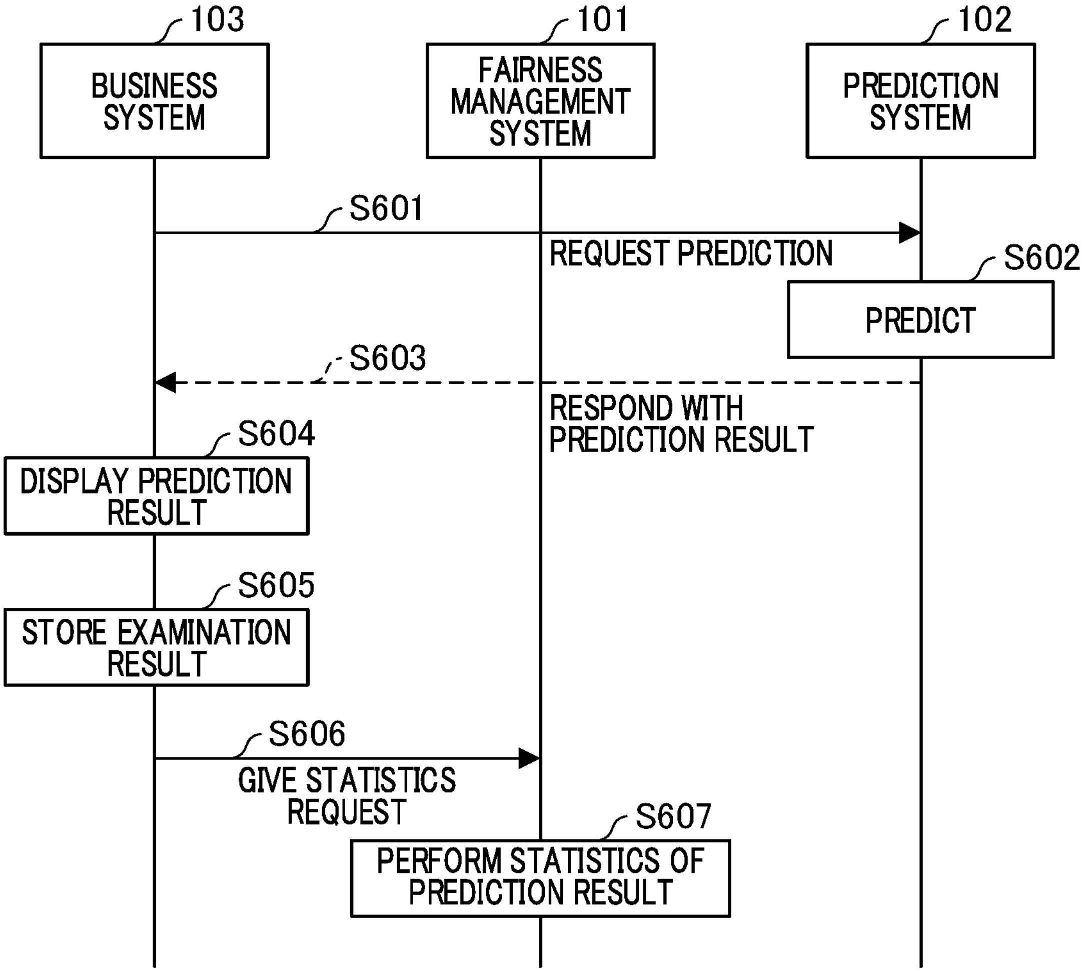
FIG. 6 is a sequence diagram illustrating processes of the business system 103, the fairness management system 101, and the prediction system 102 when insurance application examination is predicted.

FIG. 6 is a sequence diagram illustrating processes of the business system 103, the fairness management system 101, and the prediction system 102 when insurance application examination is predicted. Here, the example of the car insurance application examination has been described, but a process for a life insurance application examination is similar to a process for a car insurance application examination.

In the case of car insurance, the data input section 501 of the car insurance application examination screen 500-2 has input fields for a name and an address and a pull-down for selecting an age, a sex, the number of license years, and a driving frequency.

A manager who examines a car insurance application inputs and selects information regarding an applicant to the data input section 501 of the car insurance application examination screen 500-2 and presses the button 502.

In step S601, the display unit 311 of the business system 103-2 receives a press of the button 502 and the control unit 308 requests the prediction system 102-2 to make prediction via the communication unit 310 in response to the reception of the press of the button 502. At this time, the prediction request includes data input to the data input unit 401. The data included in the prediction request herein may not be all information regarding an applicant input to the data input unit 401 and may be only data necessary for a learned model of the prediction system 102-2. For example, in the embodiment, a name and an address are not included in the prediction request. An age, a sex, the number of license years, and a driving frequency are included in the prediction request.

In step S602, the communication unit 307 of the prediction system 102-2 receives a prediction request and the control unit 305 performs prediction using input data included in the prediction request in accordance with the learned model stored in the data storage unit 306 in response to the reception of the prediction request.

In this description, a prediction result in step S602 is assumed to be "rejection."

In step S603, the communication unit 307 responds to the business system 103-2 with the prediction result of step S602.

In step S604, the communication unit 310 of the business system 103-2 receives the prediction result and the display unit 311 displays the prediction result in the pull-down 503 of the car insurance application examination screen 500-2 in response to the reception of the prediction result. In this description, since the prediction result is the rejection, the pull-down 503 of the display unit 311 is in a state in which "rejection" is selected.

The manager who examines the car insurance application performs examination with reference to the prediction result displayed in the pull-down 503. The manager can also change the prediction result of the prediction system 102-2 and set the pull-down 503 to "approval."

In step S605, the display unit 311 of the business system 103-2 receives a press of the button 504 and the control unit 308 confirms a current selection state of the pull-down 503 as an examination result and stores the examination result in the data storage unit 309 in response to the reception of the press of the button 504.

When the manager presses the button 505 without pressing the button 504, the display unit 311 receives the press of the button 505 and the control unit 308 ends the process without storing the examination result in the data storage unit 309 in response to the reception of the press of the button 505.

When the examination result is confirmed in step S606, the control unit 308 gives a statistics request to the fairness management system 101 via the communication unit 310. At this time, the data included in the prediction request in step S601 and the prediction result received in S603 are included in the statistics request.

In step S607, the communication unit 303 of the fairness management system 101 receives the statistics request and the control unit 301 performs statistics of the prediction result in response to the reception of the statistics request. The statistics of the prediction result is a process of registering a result of this prediction in a prediction result statistics table of Table 3.

Table 3 is a table showing an example of the prediction result statistics table. The prediction result statistics table is stored in the data storage unit 302 of the fairness management system 101. In the prediction result statistics table, one record indicates one monitoring target. The prediction result statistics table has columns for users, models, items, values, the number of applications, and the number of approvals. In the prediction result statistics table, the number of applications and the number of approvals are retained for each monitoring target and a comparison target of items stored in the fairness monitoring table of Table 2. The number of applications is an example of a total number of predictions predicted by the first model using the input including the first input value. The number of approvals is an example of the number of times the prediction result predicted by the first model using the input including the first input value is a predetermined prediction result.

Table 3 shows that the number of applications and the number of approvals in "18 to 25 years old" are respectively 100 and 81, and the number of applications and the number of approvals in "26 to 60 years old" are respectively 200 and 180 in the past application content and application result. Table 3 also shows that the number of applications and the number of approvals in which a sex is "female" are respective 100 and 81 and the number of applications and the number of approvals in which a sex is “male” are respective 200 and 180 in the past application content and application result.

TABLE 3

| Users | Models | Items | Values | Number of applications | Number of approvals |
|---|---|---|---|---|---|
| Insurance company A | Car insurance | Age | 18 to 25 | 100 | 81 |
| Insurance company A | Car insurance | Age | 26 to 60 | 200 | 180 |
| Insurance company A | Car insurance | Sex | Female | 100 | 81 |
| Insurance company A | Car insurance | Sex | Male | 200 | 180 |

Here, in information regarding current applicants (the applicants for which the prediction in step S602 in the above description is “rejection”), it is assumed that the sex is “female” and the age is “20 years old.” In this case, in step S607, it is assumed that the control unit 301 adds 1 to the number of applications of the record in which the age is “18 to 25 years old” in the prediction result statistics table to obtain 101, and the number of approvals of this record remains to be 81 without addition. Further, the control unit 301 adds 1 to the number of applications of the record in which the sex is “female” in the prediction result statistics table to obtain 101 and the number of approvals of this record remains to be 81 without addition.

In the embodiment, the example in which the statistics of the prediction result is performed after the confirmation of the examination result (step S605) has been described. This is because repetition and prediction in an input error in the case in which the same input data is predicted a plurality of times are excluded from the statistics. According to the embodiment, for example, a case in which the button 502 is pressed a plurality of times and a case in which the button 502 is pressed in a state in which erroneous data is input can be excluded from the statistics.

A timing at which the statistics of the prediction result is performed is not limited thereto. For example, in an example in which a prediction result is not canceled and is confirmed as an examination result and in the case of a system in which an input error is not assumed, the statistics of the prediction result may be performed at another timing. In this case, the prediction system 102 may notify the fairness management system 101 of a prediction result at a time point at which the prediction is performed in step S602 and may perform the statistics at this time point.

<Process of Monitoring Fairness>

Figure 7:
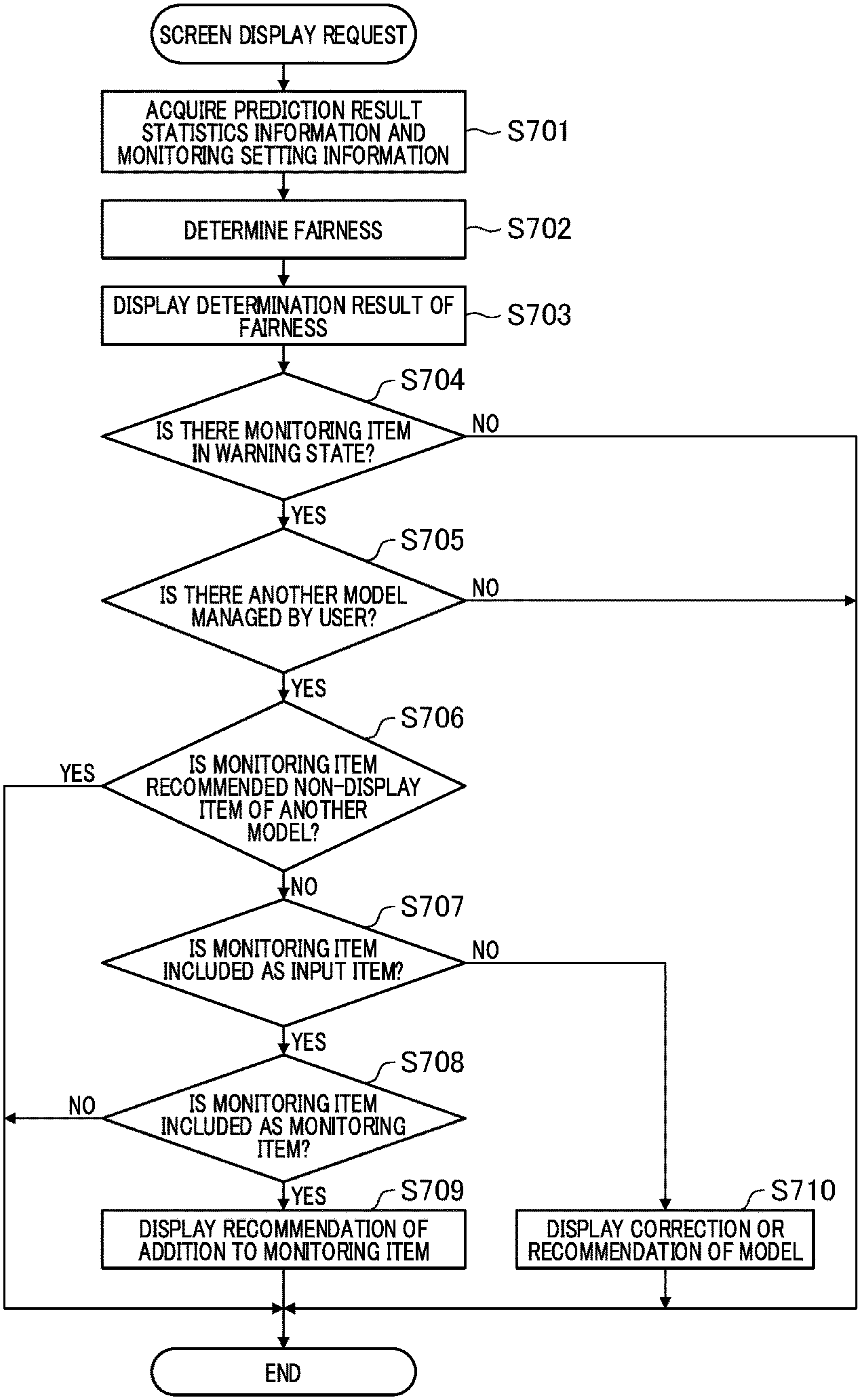
FIG. 7 is a flowchart illustrating a process of monitoring fairness.
Figure 8:
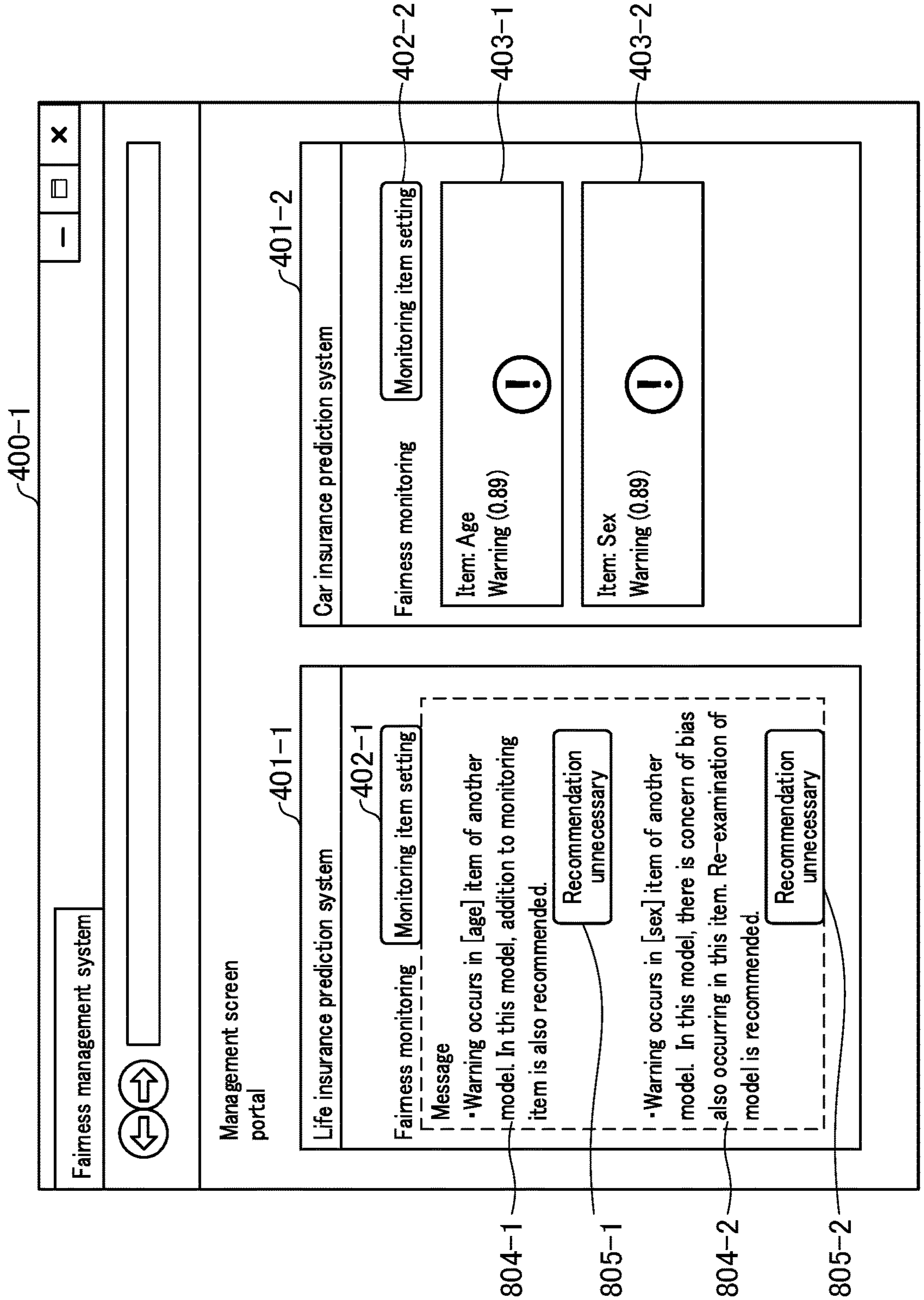
FIG. 8 is a diagram illustrating a state displayed through a process of FIG. 7 in a prediction system monitoring screen 400-1 illustrated in FIG. 4A.

Hereinafter, a process performed by the fairness management system 101 and performed to monitor fairness of the prediction system 102 will be described with reference to FIG. 7. FIG. 7 is a flowchart illustrating a process of monitoring fairness. FIG. 8 is a diagram illustrating a state displayed through a process of FIG. 7 in the prediction system monitoring screen 400-1 illustrated in FIG. 4A. The prediction system monitoring screen 400-1 in FIG. 8 is generated by the display unit 304 of the fairness management system 101 and is displayed on a browser of a PC used by a prediction system manager of the insurance company A in response to a request from the browser of the PC. The PC is connected to the network 104 and can communicate with the fairness management system 101. The PC may have a different configuration from the fairness management system 101 or may be configured by the fairness management system 101. In the prediction system monitoring screen 400-1 in FIG. 8, the same reference numerals as those of FIG. 4A are given to the same display as that of the prediction system monitoring screen 400-1 in FIG. 4A.

Areas 804-1 and 804-2 displayed in the area 401-1 for the prediction system 102-1 in the prediction system monitoring screen 400-1 in FIG. 8 are areas in which monitoring setting recommendation information to be described below is displayed. A process of displaying the monitoring setting recommendation information is an example of a provider for providing a message for prompting setting of a condition which is a monitoring target by a monitor in specific items. The “age” and the “sex” in which a warning occurs in car insurance prediction are examples of specific items.

First, in the process of monitoring fairness, the display unit 304 of the fairness management system 101 receives a display request from a browser of a PC. In step S701 of FIG. 7, the control unit 301 acquires prediction result statistics information and monitoring setting information from the prediction result statistics table (see Table 3) and the fairness monitoring table (see Table 2) stored in the data storage unit 302 in response to the reception of the display request. The prediction result statistics information is information stored in the prediction result statistics table. The monitoring setting information is information stored in the fairness monitoring table.

In step S702, the control unit 301 determines fairness using the information acquired in step S701.

In the case of a state of Table 3, when the “age” which is a monitoring item is “18 to 25 years old,” an approval ratio (number of approvals/number of applications) is 0.81. When the “age” is “26 to 60 years old,” an approval ratio is 0.9. Therefore, a ratio of the approval ratio of the monitoring target to an approval ratio of a comparison target is 0.9 and is not less than a threshold of 0.9 of the fairness monitoring table of Table 2. Thus, in the embodiment, the control unit 301 determines that the case in which the “age” which is the monitoring item is “18 to 25 years old” is in a normal range and determines that the case is “fair” as fairness determination.

For the “sex” which is one additional monitoring item, an approval ratio is 0.81 when the sex is “female.” An approval ratio is 0.9 when the sex is “male.” Therefore, a ratio of the approval ratio of the monitoring target to an approval ratio of a comparison target is 0.9 and is not less than a threshold of 0.9 of the fairness monitoring table of Table 2. Thus, in the embodiment, the control unit 301 determines that the case in which the “sex” which is the monitoring item is “female” is in a normal range and determines that the case is “fair” as fairness determination.

Further, a case in which data indicating that the sex is “female,” the age is “20 years old,” and the prediction result is “rejection” as information regarding an applicant in the state of Table 3, as described above, is added to the prediction result statistics table will be described. In this case, an approval ratio is about 0.8 when the “age” which is a monitoring item is “18 to 25 years old.” An approval ratio is 0.9 when the age is “26 to 60 years old.” Therefore, a ratio of the approval ratio of the monitoring target to an approval ratio of a comparison target is about 0.89 and is less than a threshold of 0.9. Thus, in the embodiment, the control unit 301 determines that the case in which the “age” which is the monitoring item is “18 to 25 years old” is in a bias state and determines that the case is “unfair” as fairness determination.

For the “sex” which is one additional monitoring item, an approval ratio is about 0.8 when the sex is “female.” An approval ratio is about 0.9 when the sex is "male." Therefore, a ratio of the approval ratio of the monitoring target to an approval ratio of a comparison target is about 0.89 and is not less than a threshold of 0.9. Thus, in the embodiment, the control unit 301 determines that the case in which the "sex" which is the monitoring item is "female" is in a bias state and determines that the case is "unfair" as fairness determination.

In step S703, the display unit 304 displays the calculation result of the fairness of the monitoring target and the determination result of the fairness with regard to each monitoring item in the areas 403-1 and 403-2 in accordance with the determination result of the fairness in step S702. This process is an example of a monitor performing a warning of a specific item of an input corresponding to a predetermined condition when the result of the prediction by the first model using the input including a plurality of values satisfies the predetermined condition.

FIG. 4A illustrates a display example when the learned model of the car insurance prediction is determined to be in a fair state in step S702. In FIG. 4A, as the calculation result of the fairness, "0.9" is displayed in the area 403-1 and "0.9" is displayed in the area 403-2. In FIG. 4A, as the determination result of the fairness, "normal" is displayed in the area 403-1 and "normal" is displayed in the area 403-2.

In the case of FIG. 4A, since any monitoring item is normal and is not in a warning state, the control unit 301 determines in step S704 that there is no monitoring item in the warning state and ends the process.

FIG. 8 illustrates a display example when the learned model of the car insurance prediction is determined to be in an unfair state in step S702. In FIG. 8, as the calculation result of the fairness, "0.89" is displayed in the area 403-1 and "0.89" is displayed in the area 403-2. In FIG. 8, as the determination result of the fairness, "warning" is displayed in the area 403-1 and "warning" is displayed in the area 403-2.

In the case of FIG. 8, since any monitoring item is in a warning state, the control unit 301 determines in step S704 that there is a monitoring item in the warning state and the process transitions to step S705.

In step S705, the control unit 301 checks whether there is a learned model managed by the insurance company A other than the learned model in which a warning of fairness occurs by using the learned model management table of Table 1. When the control unit 301 determines in step S705 that there is no learned model managed by the insurance company A other than the learned model in which the warning of fairness occurs, the process ends. When the control unit 301 determines in step S705 that there is a learned model managed by the insurance company A other than the learned model in which the warning of fairness occurs, the process transitions to step S706. In the case of the embodiment, as the learned model in which the warning occurs, there are a learned model of the car insurance prediction and a learned model of the life insurance prediction as another learned model.

In step S706, the control unit 301 checks whether a monitoring item in which the warning of fairness occurs is a recommended non-display item in the learned model managed by the insurance company A other than the learned model in which the warning of fairness occurs. The recommended non-display item will be described later. In step S706, when the control unit 301 determines that the monitoring item in which the warning of fairness occurs is the recommended non-display item, the process ends. When the control unit 301 determines in step S706 that the monitoring item in which the warning of fairness occurs is not the recommended non-display item, the process transitions to step S707.

In step S707, the control unit 301 checks whether the other learned model different from the learned model in which the warning occurs has the same item as the monitoring item in which the warning occurs as an input item. When the control unit 301 determines in step S707 that the other learned model different from the learned model in which the warning occurs does not have the same item as the monitoring item in which the warning occurs as an input item, the process transitions to step S710. In step S710, the display unit 304 performs display indicating correction of the learned model, that is, recommendation of relearning, based on the determination result by the control unit 301 in step S707. That is, in step S710, the display unit 304 provides a message prompting the learned model to be relearned with learning data in which the monitoring item in which the warning occurs is included in the input item. When the control unit 301 determines in step S707 that the other learned model different from the learned model in which the warning occurs has the same item as the monitoring item in which the warning occurs as an input item, the process transitions to step S708.

When there is a bias of fairness in a specific item of one learned model with respect to a plurality of learned models managed by the same user, there is a possibility of a bias in the specific item also in another learned model generated by the user. Therefore, although it is intrinsically necessary to monitor the same item in a plurality of learned models, it is considered that monitoring setting is omitted. In the case of the embodiment, monitoring items in which the warning occurs in the learned model for car insurance prediction are the "age" and the "sex," but the learned model for life insurance prediction has the "age" as an item and does not have the "sex." In step S707, the control unit 301 checks this situation.

In step S708, the control unit 301 checks whether the other learned model different from the learned model in which the warning occurs has the same item as the monitoring item in which the warning occurs as a monitoring item. When the control unit 301 determines in step S708 that the other learned model different from the learned model in which the warning occurs does not have the same item as the monitoring item in which the warning occurs as a monitoring item, the process ends. When the control unit 301 determines in step S708 that the other learned model different from the learned model in which the warning occurs has the same item as the monitoring item in which the warning occurs as a monitoring item, the process transitions to step S709. In step S709, the display unit 304 performs display indicating recommendation of addition to the monitoring item based on a determination result by the control unit 301 in step S708.

In the embodiment, in step S708, the control unit 301 checks whether the "age" is included as a monitoring item in the learned model of the life insurance prediction. When the control unit 301 checks in step S708 that the "age" is already included as the monitoring item in the learned model of the life insurance prediction, the process ends. In the embodiment, since the "age" is not included as the monitoring item in the learned model of the life insurance prediction in step S708, the control unit 301 determines to recommend addition to the monitoring item. In the embodiment, in step S709, the display unit 304 performs display indicating recommendation of addition of the "age" to the monitoring item in the area 804-1 of FIG. 8 based on a determination result by the control unit 301 in step S708.

In the embodiment, in step S707, the control unit 301 determines to recommend addition of the "sex" as an input item of the learned model of the life insurance prediction and addition of the "sex" to the monitoring item in the learned model of the life insurance prediction. In the embodiment, in step S710, the display unit 304 performs display indicating recommendation of correction of the learned model of the life insurance prediction so that the "sex" is set as an input item in the area 804-2 of FIG. 8 based on a determination result by the control unit 301 in step S707. In the embodiment, in step S710, the display unit 304 may perform display indicating recommendation of addition of the "sex" to the monitoring item in the area 804-2 of FIG. 8 based on a determination result by the control unit 301 in step S707.

The learned model of the life insurance prediction does not have the "sex" as a learned input item. That is, the "sex" does not contribute to prediction of the prediction system 102-1. As a result, the learned model is considered as a learned model that derives a prediction result for which an applicant doubts that there is a bias in the "sex." According to the embodiment, by recommending re-examination of the learned model, as described above, the prediction system manager can ascertain an item which may become a problem from the viewpoint of the bias. Thus, it is possible to provide a notice to construct a learned model in which a bias is less.

The prediction system manager can check the area 804-1 of FIG. 8 and recommendation information displayed in the area 804-1, determine whether recommended content is appropriate, correct omission of monitoring setting, and reconstruct the learned model.

In the embodiment, when the prediction system manager checks the area 804-1 of FIG. 8 and the recommended information displayed in the area 804-1 and determines that application of the recommended content is unnecessary, recommendation display can be set to non-display and can be set so that the similar recommendation is not displayed. The display unit 304 displays a button 805-1 as a recommendation-unnecessary button for performing such setting in the area 804-1 and displays a button 805-2 in the area 804-2.

When a press of the button 805-1 is received, the display unit 304 does not display the recommendation display of the "age" in the learned model of the life insurance prediction. When a press of the button 805-2 is received, the display unit 304 does not display the recommendation display of the "sex" in the learned model of the life insurance prediction. Further, the control unit 301 stores information indicating the non-display of the recommendation in a recommendation non-display table so that the recommendation is not displayed in this way. In the determination of steps S707 and S708, the control unit 301 determines not to recommend the addition of a recommendation non-display item stored in the recommendation non-display table as an input item of the learned model and addition of the recommendation non-display item to the monitoring item.

Table 4 is a table showing an example of the recommendation non-display table. The recommendation non-display table is stored in the data storage unit 302. In the recommendation non-display table, one record indicates one recommendation non-display item. In Table 4, the recommendation non-display table in which the "age" in the life insurance prediction is set as a recommendation non-display item has columns of a user, a model, and a recommendation non-display item.

TABLE 4

| User | Model | Recommendation non-display Item |
|---|---|---|
| Insurance company A | Life insurance | Age |

In the embodiment, the method of determining the fairness in response to the request from the browser has been described. However, the fairness may be determined when the statistics of the prediction result is performed in the prediction result statistics process (step S607) of FIG. 6.

In this case, when a mail address or the like of the prediction system manager is retained in advance in the fairness management system 101 and the ratio is less than the threshold, the prediction system manager may be notified using an electronic mail or the like.

In this case, the fairness management system 101 may automatically add a monitoring item in which a warning occurs to a monitoring item of another learned model without performing recommendation display.

In the embodiment, the example in which similar monitoring setting is recommended in another learned model at the time of occurrence of a warning from determination that there is a possibility of a bias occurring in a specific item in a learned model generated by a user when a warning of a bias occurs actually has been described. An objective of this example is to set necessary and sufficient monitoring setting while avoiding an unnecessary increase in an effort of the prediction system manager since the monitoring items are excessive. However, a timing at which the monitoring setting is recommended is not limited thereto. For example, when setting of a monitoring item is performed in a certain learned model on the monitoring item setting screen (see FIG. 4B), the fairness management system 101 may recommend setting of a similar monitoring item for another learned model. When a predetermined condition of the monitoring is set in the learned model of the car insurance prediction system which is the first model, setting of a similar monitoring item may be recommended in a learned model of the car insurance prediction system. When a new prediction system is registered in the system 100, monitoring setting in the learned model of the newly registered prediction system may be recommended for an item set to be monitored in the previously registered prediction system.

In the embodiment, the example in which all the learned models run by the insurance company A are set as targets and the monitoring items of one learned model are recommended to the other learned models has been described, but a targeting range may be limited. For example, a plurality of learned models managed by a user may be grouped in accordance with business content and monitoring items may be recommended in only the group.

When monitoring items of a plurality of learned models managed by a user are similar, the monitoring items may be recommended as common monitoring items. For example, when the number of common monitoring items of each learned model is equal to or greater than a certain given ratio, all the monitoring items may be recommended as common monitoring items rather than separately recommending the monitoring items.

(Other Embodiments)

Embodiments of the present invention can also be realized by a computer of a system or apparatus that reads out and executes computer executable instructions (e.g., one or more programs) recorded on a storage medium (which may also be referred to more fully as a 'non-transitory computerreadable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127057, filed Jul. 8, 2019, which is hereby incorporated by reference wherein in its entirety.

What is claimed is:

1. A system monitoring a plurality of machine-learned models generated through machine learning, the plurality of machine-learned models including (i) a first machine-learned model configured to output a first prediction result based on consideration of a plurality of first inputs input to the first machine-learned model and (ii) a second machine-learned model, different from the first machine-learned model, configured to output a second prediction result based on consideration of a plurality of second inputs input to the second machine-learned model, the system comprising:

one or more memories storing instructions; and one or more processors that execute the instructions causing the system to:

monitor the first machine-learned model and warn of a first specific input, among the plurality of first inputs input to the first machine-learned model, in a case where prediction results by the first machine-learned model using the first specific input, which includes a plurality of values, satisfy a predetermined condition;

provide, in the case where the prediction results by the first machine-learned model using the first specific input satisfy the predetermined condition, a message that prompts monitoring of a second specific input, which corresponds to the first specific input, among the plurality of second inputs input to the second machine-learned model different from the first machine-learned model;

determine whether the plurality of second inputs input to the second machine-learned model, different from the first machine-learned model, include an input corresponding to the first specific input that is input to the first machine-learned model; and provide, in a case where it is determined that the plurality of second inputs input to the second machine-learned model, different from the first machine-learned model, do not include the input corresponding to the first specific input that is input to the first machine-learned model, a message prompting relearning of the second machine-learned model, different from the first machine-learned model, with learning data including the first specific input that is input to the first machine-learned model, wherein the input corresponding to the first specific input is used for determining a bias of fairness in any one of the machine learned models in the plurality of the machine learned models.

2. The system according to claim 1, wherein the instructions stored in the one or more memories further cause the one or more processors to group the plurality of machine-learned models, wherein the message is provided in a case where the first machine-learned model and the second machine-learned model are grouped, and wherein the message is not provided to prompt monitoring of an input, which corresponds to the first specific input, to a third machine-learned model, of the plurality of machine-learned models, which is not grouped with the first machine-learned model and the second machine-learned model.

3. The system according to claim 1, wherein the instructions stored in the one or more memories further cause the one or more processors to provide an input unit that causes the monitoring of the second specific input to the second machine-learned model to be unnecessary in a case where the message is provided.

4. The system according to claim 1, wherein the message is not provided to prompt monitoring of the second specific input to the second machine-learned model in a case where the second specific input is already being monitored in the second machine-learned model.

5. The system according to claim 1, wherein the predetermined condition is satisfied in a state where there is a bias between a prediction result by the first machine-learned model using an input including a first input value and a prediction result by the first machine-learned model using an input including a second input value.

6. The system according to claim 5, wherein a ratio of a number of times the prediction result by the first machine-learned model using the input including the first input value is a predetermined prediction result to a total number of predictions by the first machine-learned model using the input including the first input value is set as a first ratio, wherein a ratio of a number of times the prediction result by the first machine-learned model using the input including the second input value is the predetermined prediction result to a total number of predictions by the first machine-learned model using the input including the second input value is set as a second ratio, and wherein the predetermined condition is based on a ratio of the first ratio to the second ratio.

7. A method performed by a system monitoring a plurality of machine-learned models generated through machine learning, the plurality of machine-learned models including (i) a first machine-learned model configured to output a first prediction result based on consideration of a plurality of first inputs input to the first machine-learned model and (ii) a second machine-learned model, different from the first machine-learned model, configured to output a second prediction result based on consideration of a plurality of second inputs input to the second machine-learned model, the method comprising:

monitoring the first machine-learned model and warn of a first specific input, among the plurality of first inputs input to the first machine-learned model, in a case where prediction results by the first machine-learned model using the first specific input, which includes a plurality of values, satisfy a predetermined condition;

providing, in the case where the prediction results by the first machine-learned model using the first specific input satisfy the predetermined condition, a message that prompts monitoring of a second specific input, which corresponds to the first specific input, among the plurality of second inputs input to the second machine-learned model different from the first machine-learned model;

determining whether the plurality of second inputs input to the second machine-learned model, different from the first machine-learned model, include an input corresponding to the first specific input that is input to the first machine-learned model; and providing, in a case where it is determined that the plurality of second inputs input to the second machine-learned model, different from the first machine-learned model, do not include the input corresponding to the first specific input that is input to the first machine-learned model, a message prompting relearning of the second machine-learned model, different from the first machine-learned model, with learning data including the first specific input that is input to the first machine-learned model, wherein the input corresponding to the first specific input is used for determining a bias of fairness in any one of the machine learned models in the plurality of the machine learned models.

8. A non-transitory storage medium on which is stored a computer program for making a computer of a system, which monitors a plurality of machine-learned models generated through machine learning, the plurality of machine-learned models including (i) a first machine-learned model configured to output a first prediction result based on consideration of a plurality of first inputs input to the first machine-learned model and (ii) a second machine-learned model, different from the first machine-learned model, configured to output a second prediction result based on consideration of a plurality of second inputs input to the second machine-learned model, execute:

monitoring the first machine-learned model and warn of a first specific input, among the plurality of first inputs input to the first machine-learned model, in a case where prediction results by the first machine-learned model using the first specific input, which includes a plurality of values, satisfy a predetermined condition;

providing, in the case where the prediction results by the first machine-learned model using the first specific input satisfy the predetermined condition, a message that prompts monitoring of a second specific input, which corresponds to the first specific input, among the plurality of second inputs input to the second machine-learned model different from the first machine-learned model;

determining whether the plurality of second inputs input to the second machine-learned model, different from the first machine-learned model, include an input corresponding to the first specific input that is input to the first machine-learned model; and providing, in a case where it is determined that the plurality of second inputs input to the second machine-learned model, different from the first machine-learned model, do not include the input corresponding to the first specific input that is input to the first machine-learned model, a message prompting relearning of the second machine-learned model, different from the first machine-learned model, with learning data including the first specific input that is input to the first machine-learned model, wherein the input corresponding to the first specific input is used for determining a bias of fairness in any one of the machine learned models in the plurality of the machine learned models.

* * * * *